(12) United States Patent
Bolleni et al.

(10) Patent No.: US 12,028,742 B2
(45) Date of Patent: Jul. 2, 2024

(54) WIRELESS UPLINK (UL) BANDWIDTH ENHANCEMENT WITH MACHINE LEARNING FOR COMPRESSION ESTIMATE

(71) Applicant: QUALCOMM Incorporated, San Diego, CA (US)

(72) Inventors: Vijay Kumar Bolleni, San Diego, CA (US); Rajashekar Chilla, San Diego, CA (US); Prachi Agrawal, Hyderabad (IN); Prasad Gadde, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/568,368

(22) Filed: Jan. 4, 2022

(65) Prior Publication Data

US 2023/0217302 A1 Jul. 6, 2023

(51) Int. Cl.
*H04W 28/02* (2009.01)
*G06N 20/00* (2019.01)

(52) U.S. Cl.
CPC ........ *H04W 28/0278* (2013.01); *G06N 20/00* (2019.01)

(58) Field of Classification Search
CPC .... H04W 28/0278; G06N 20/00; G06N 3/044
See application file for complete search history.

(56) References Cited

U.S. PATENT DOCUMENTS

| 2016/0142934 A1* | 5/2016 | Ahmadzadeh | H04W 28/06 370/328 |
| 2022/0038945 A1* | 2/2022 | Dalmiya | H04W 28/0278 |

* cited by examiner

*Primary Examiner* — Mohammad S Anwar
(74) *Attorney, Agent, or Firm* — QUALCOMM Incorporated

(57) ABSTRACT

A method of wireless communication by a user equipment (UE) includes determining an original amount of uplink data stored in a non-compression buffer, the original amount of data designated to be transmitted to a network. The method also includes predicting, with a machine learning model, an amount of compression gain for the original amount of uplink data. The compression gain is obtained by compressing the original amount of uplink data during a time delay. The method further includes generating a buffer status report based on the original amount of uplink data and the predicted amount of compression gain. The method transmits the buffer status report to the network.

30 Claims, 9 Drawing Sheets

WIRELESS UPLINK (UL) BANDWIDTH ENHANCEMENT WITH MACHINE LEARNING FOR COMPRESSION ESTIMATE

FIELD OF THE DISCLOSURE

Aspects of the present disclosure generally relate to wireless communications, and more particularly to techniques and apparatuses for a fifth generation (5G) new radio (NR) uplink (UL) bandwidth enhancement with machine learning compression estimates.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

A method of wireless communication by a user equipment (UE) includes determining an original amount of uplink data stored in a non-compression buffer, the original amount of data designated to be transmitted to a network. The method also includes predicting, with a machine learning model, an amount of compression gain for the original amount of uplink data. The compression gain is obtained by compressing the original amount of uplink data during a time delay. The method further includes generating a buffer status report based on the original amount of uplink data and the predicted amount of compression gain. The method also includes transmitting the buffer status report to the network.

An apparatus for wireless communication by a user equipment (UE) includes means for determining an original amount of uplink data stored in a non-compression buffer. The original amount of data is designated to be transmitted to a network. The apparatus also includes means for predicting, with a machine learning model, an amount of compression gain for the original amount of uplink data. The compression gain is obtained by compressing the original amount of uplink data during a time delay. The apparatus further includes means for generating a buffer status report based on the original amount of uplink data and the predicted amount of compression gain. The apparatus also includes means for transmitting the buffer status report to the network.

A user equipment (UE) includes a processor and a memory coupled with the processor. The UE also includes instructions stored in the memory. When the instructions are executed by the processor the UE is operable to determine an original amount of uplink data stored in a non-compression buffer, the original amount of data designated to be transmitted to a network. The UE is also operable to predict, with a machine learning model, an amount of compression gain for the original amount of uplink data. The compression gain is obtained by compressing the original amount of uplink data during a time delay. The UE is further operable to generate a buffer status report based on the original amount of uplink data and the predicted amount of compression gain. The UE is also operable to transmit the buffer status report to the network.

A non-transitory computer-readable medium having program code recorded thereon is executed by a processor. The non-transitory computer-readable medium includes program code to determine an original amount of uplink data stored in a non-compression buffer. The original amount of data is designated to be transmitted to a network. The non-transitory computer-readable medium also includes program code to predict, with a machine learning model, an amount of compression gain for the original amount of uplink data. The compression gain is obtained by compressing the original amount of uplink data during a time delay. The non-transitory computer-readable medium further includes program code to generate a buffer status report based on the original amount of uplink data and the predicted amount of compression gain. The non-transitory computer-readable medium also includes program code to transmit the buffer status report to the network.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
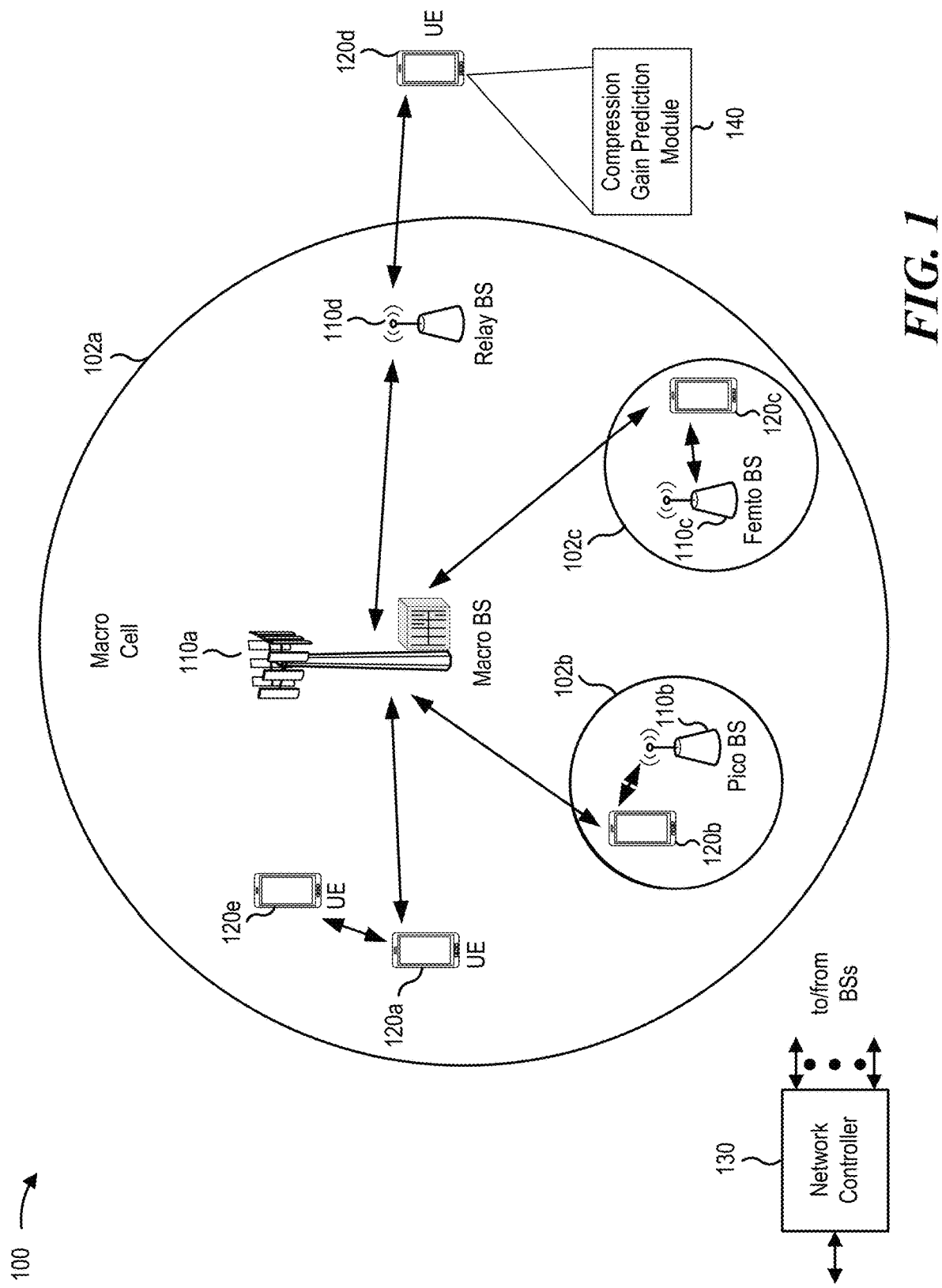
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In 5G NR, a network (e.g., a base station) is configured to optimize uplink resources by limiting allocation of uplink resources (e.g., an uplink grant or a network grant) to situations in which a user equipment (UE) is in possession of data to transmit. In this configuration, the base station is configured to avoid allocating excessive uplink resources to the UE, which avoids wasting resources. In order to transmit data, the UE performs a dynamic scheduling procedure when the UE acquires new data for transmission. When the UE has new data, the UE may send a scheduling request (SR) to the base station. The base station may respond to the scheduling request by sending a grant to the UE. For example, the base station provides a default uplink grant that is used by the UE to transmit a buffer status report (BSR).

A buffer status report refers to a media access control (MAC) layer message sent from the UE to the base station indicating how much data is waiting in a UE buffer for uplink transmission. Contents of the UE buffer may include compressed data and uncompressed data. Generation of the buffer status report is thus complicated by uplink data compression. In one example, an uplink data compression (UDC) protocol may be based on a DEFLATE compress data formation specification (e.g., Internet Engineering Task Force (IETF) RFC 1951) used to save uplink resources. In other examples, Level 0 or ZIP compression is employed.

Compressed data refers to deflated (e.g., compressed) blocks generated from an original packet data convergence protocol (PDCP) service data unit (SDU) stored in a compression buffer of the UE. Uncompressed data refers to original PDCP SDU data for SDUs, which are not compressed, stored in a non-compression buffer.

According to the 5G NR standard, the buffer status report is configured to report a MAC buffer occupancy, which refers to the total number of bytes in the non-compression buffer and the number of bytes in the compression buffer. In this configuration, the buffer status report is a MAC buffer occupancy report indicating an amount of compressed data (e.g., a current amount of compressed data in the compression buffer) plus an amount of uncompressed data (e.g., a current amount of uncompressed data in the non-compressed buffer). Unfortunately, an actual amount of buffer status report data requested by the UE is generally higher than specified for transmitting compressed bytes over an uplink channel. In particular, the buffer status report triggered by the UE generally does not account for a time delay incurred due to the noted dynamic scheduling, which includes transmission of the buffer status report, network grants, and uplink data transmission. This excess uplink resource allocation results in wasted uplink network resources as well as additional consumption of UE uplink power.

Aspects of the present disclosure are directed to reducing wasted uplink resources. According to some aspects of the present disclosure, uplink bandwidth is saved by predicting an amount of data that can be compressed during the time delay incurred due to the buffer status report, network grants, and uplink data transmission. This predicted amount of data is considered when triggering a buffer status report. In one configuration, the prediction is performed using machine learning with a neural processing engine (NPE).

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). The UE 120 may be included inside a housing that houses components of the UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE), or via system information (e.g., a system information block (SIB)).

The UEs 120 may include a compression gain prediction module 140. For brevity, only one UE 120d is shown as including the compression gain prediction module 140. The compression gain prediction module 140 may determine an original amount of uplink data stored in a non-compression buffer, the original amount of data designated to be transmitted to a network. The compression gain prediction module 140 may also predict, with a machine learning model, an amount of compression gain for the original amount of uplink data, the amount of compression gain obtained by compressing the original amount of uplink data during a time delay. The compression gain prediction module 140 may generate a buffer status report based on the original amount of uplink data and the predicted amount of compression gain, and transmit the buffer status report to the network.

As indicated above, FIG. 1 is provided merely as an example. Other examples may differ from what is described with regard to FIG. 1.

Figure 2:
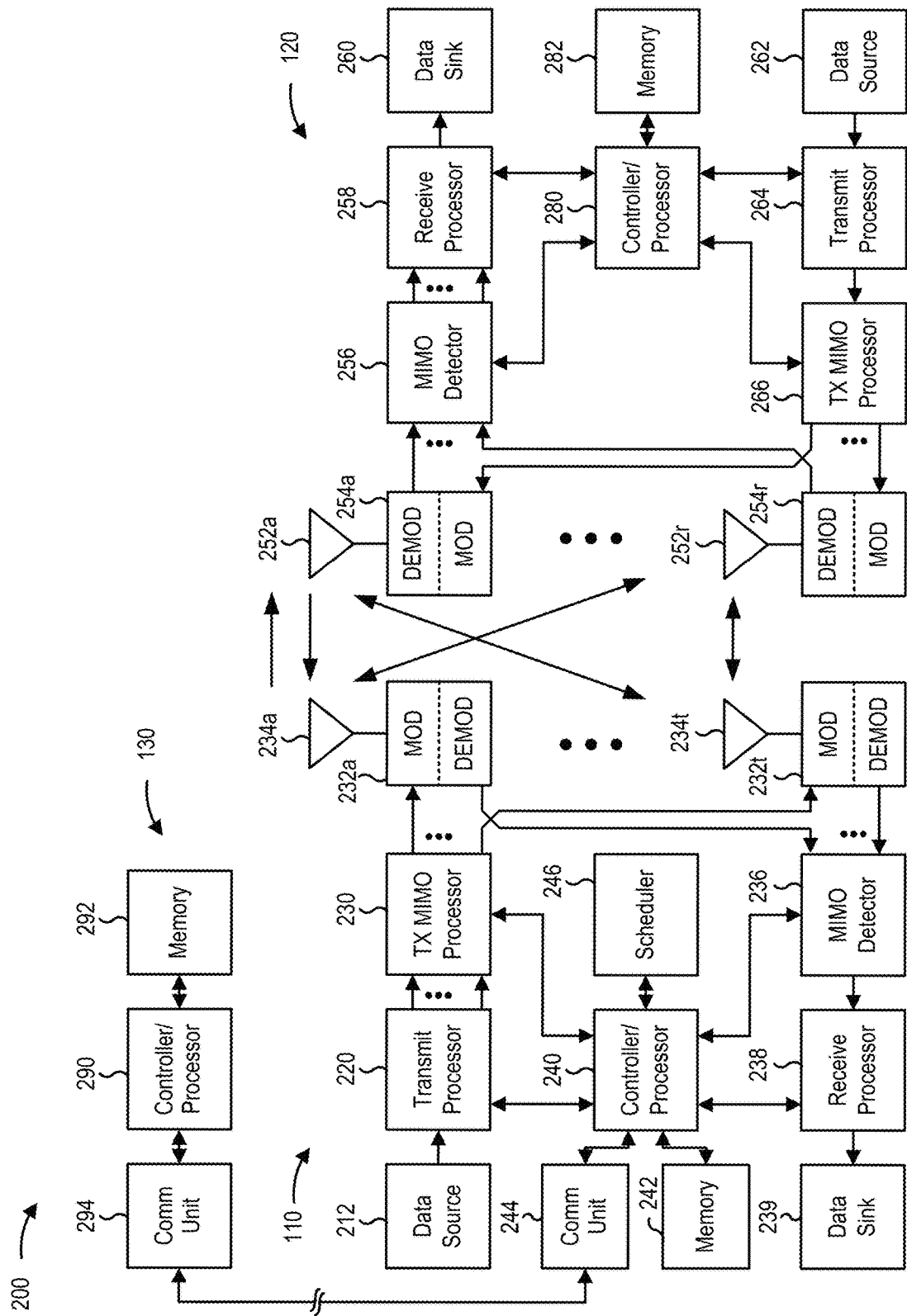
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 280 of the UE 120, and/or any other component(s) of FIG. 2 may perform one or more techniques associated with machine learning for predicting an amount of data that can be compressed during the time delay incurred due to a buffer status report, network grants, and uplink data transmission, as described in more detail elsewhere. For example, the controller/processor 280 of the UE 120, and/or any other component(s) of FIG. 2 may perform or direct operations of, for example, the processes of FIGS. 7 and 8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for determining, means for predicting, means for generating, means for transmitting, means for receiving, means for computing, means for determining, means for training, and/or means for feeding. Such means may include one or more components of the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
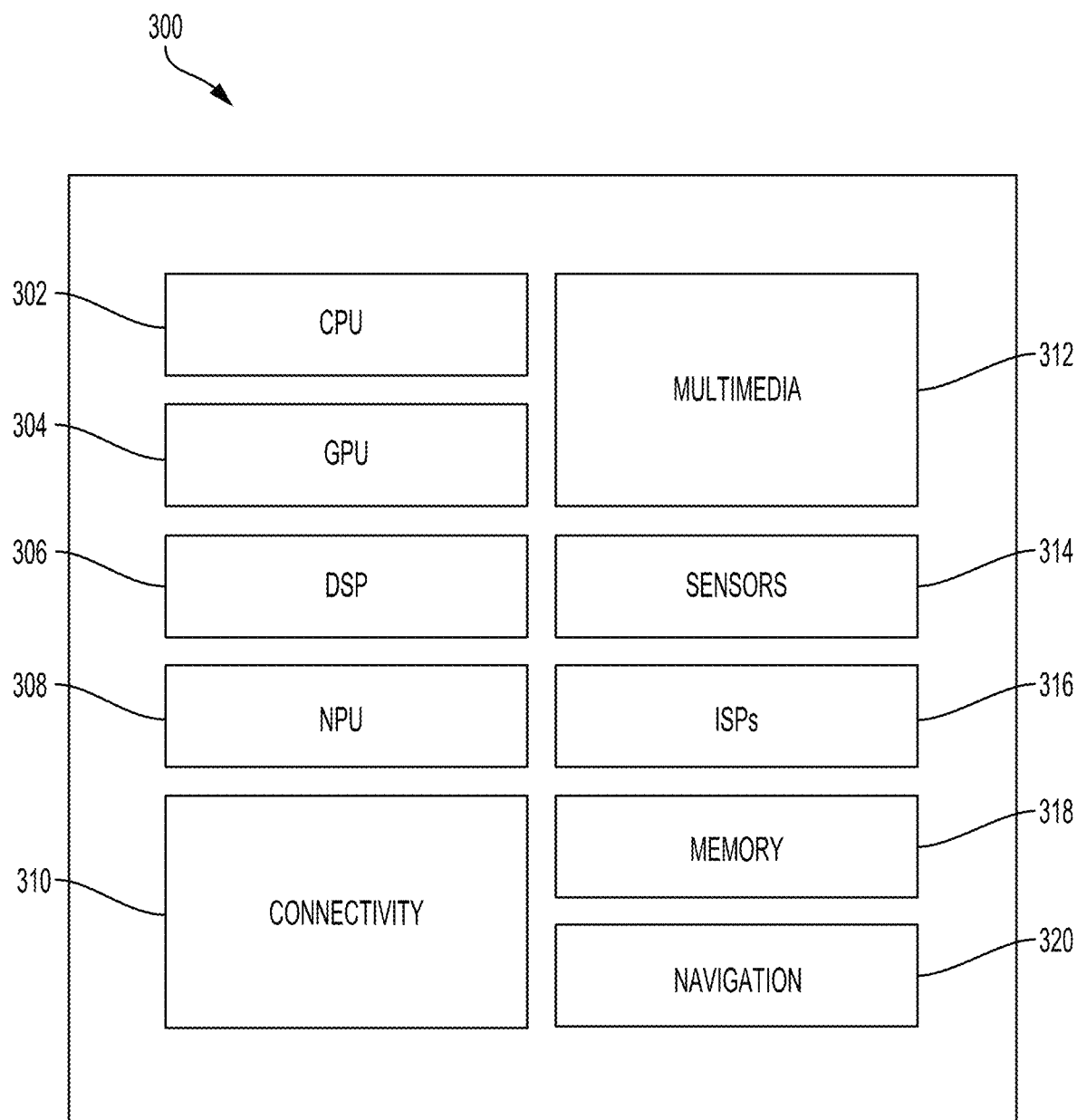
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for predicting compression gain, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise program code to determine an original amount of uplink data stored in a non-compression buffer. The original amount of data is designated to be transmitted to a network. The instructions also include program code to predict, with a machine learning model, an amount of compression gain for the original amount of uplink data. The compression gain is obtained by compressing the original amount of uplink data during a time delay. The instructions further include program code to generate a buffer status report based on the original amount of uplink data and the predicted amount of compression gain. The instructions also include program code to transmit the buffer status report to the network.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
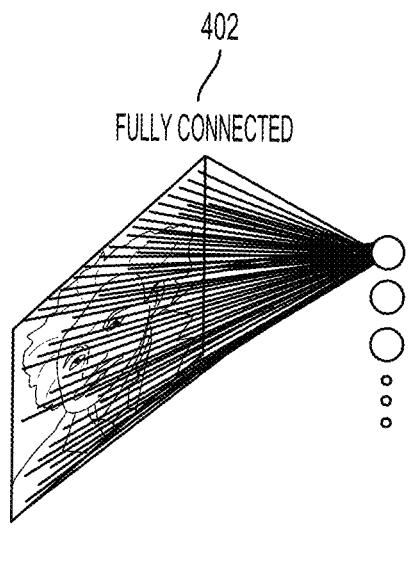
FIGS. 4A, 4B, and 4C are diagrams illustrating a neural network, in accordance with aspects of the present disclosure.
Figure 4B:
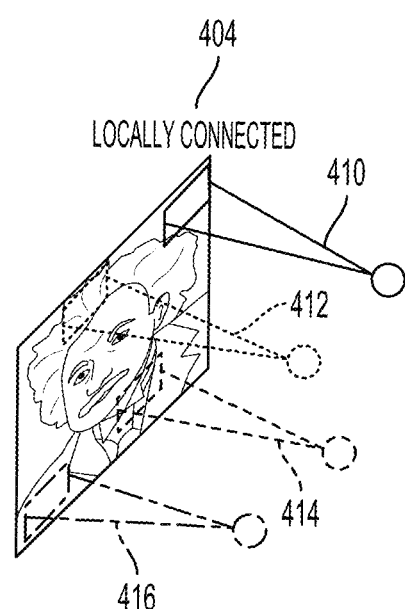

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
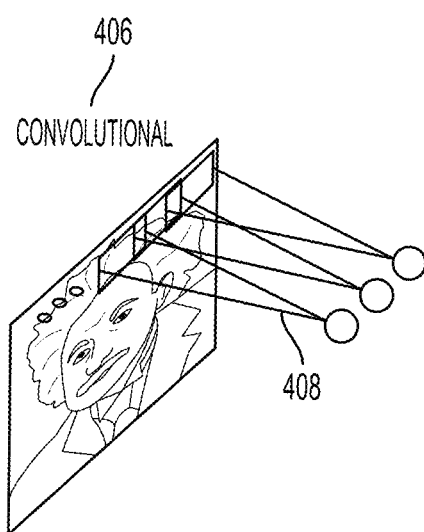

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
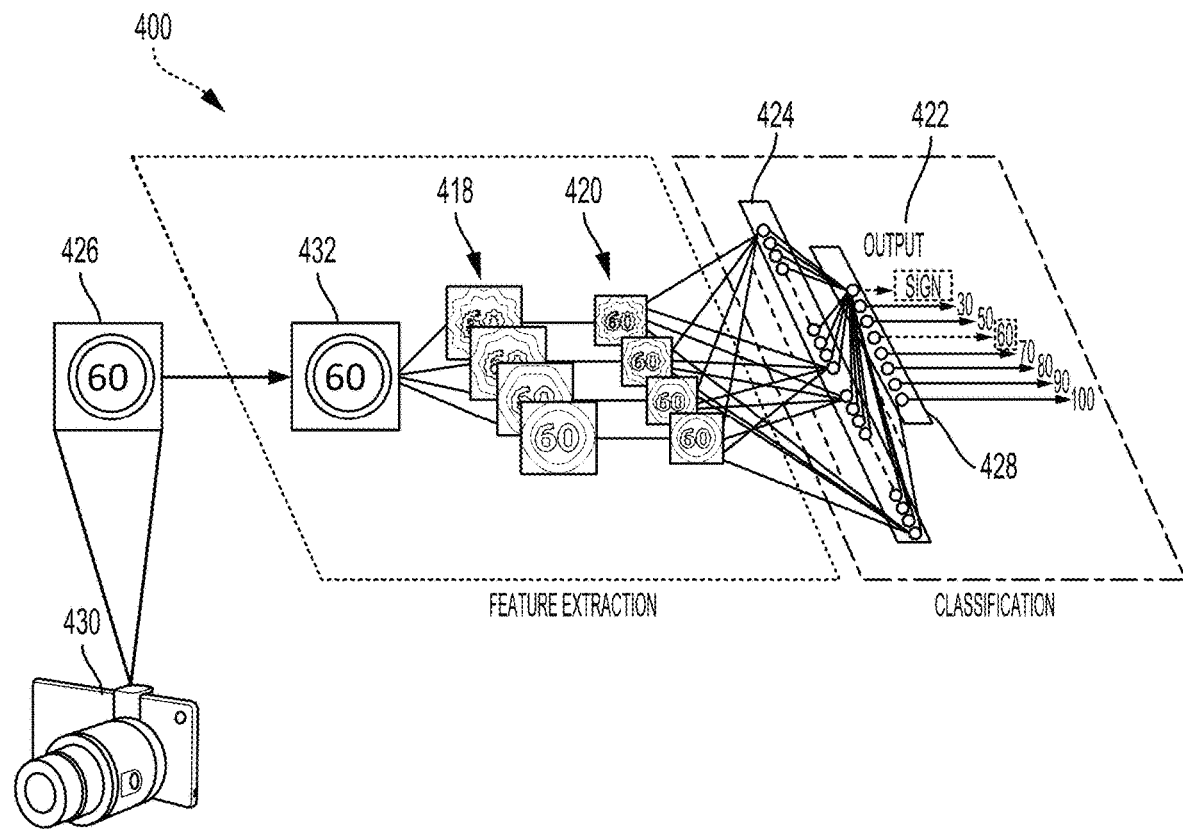
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
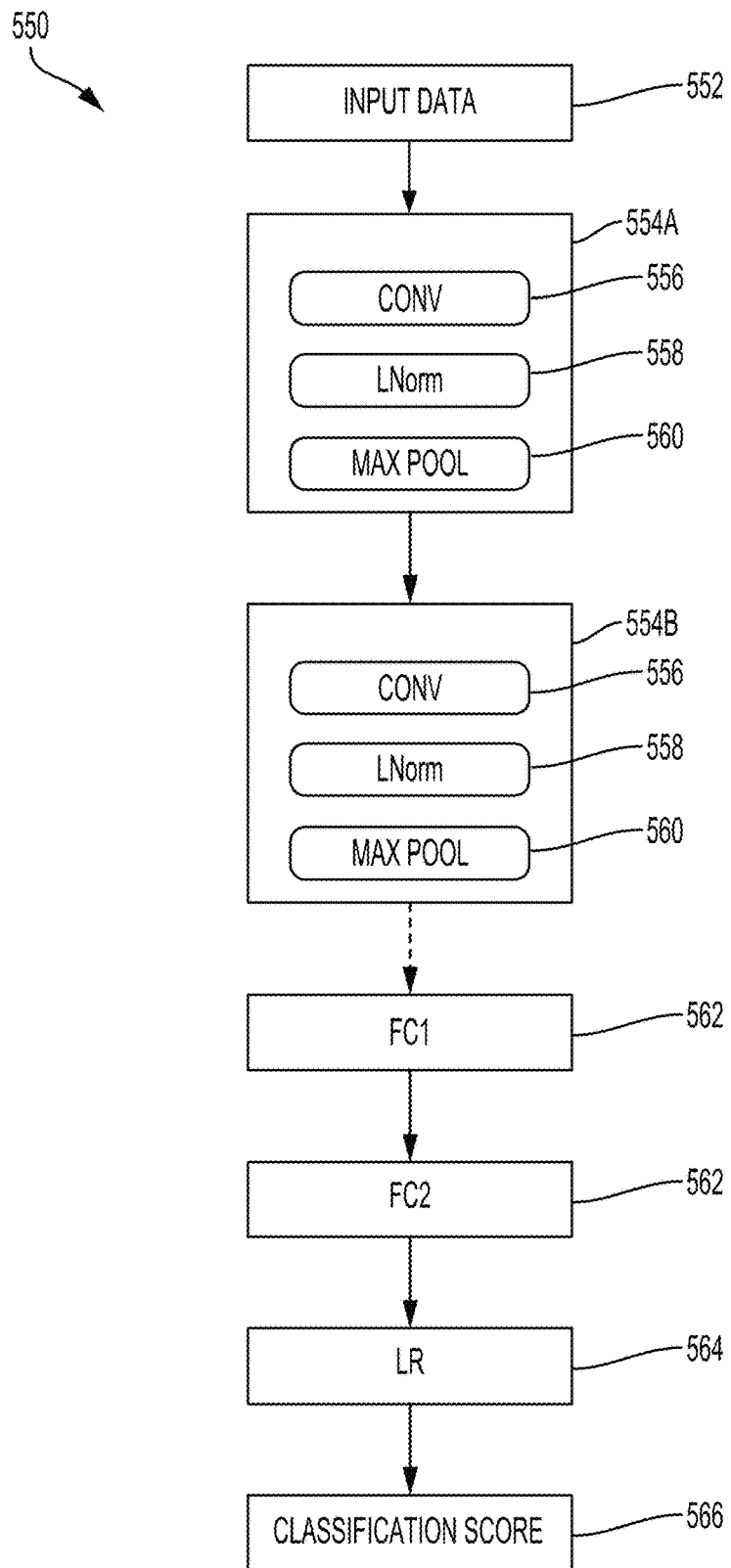
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

In 5G NR, a network (e.g., a base station) is configured to optimize uplink resources by limiting allocation of uplink resources (e.g., an uplink grant) to situations in which a user equipment (UE) is in possession of data to transmit. In this configuration, the base station is configured to avoid allocating excessive uplink resources to the UE, which avoids wasting resources. In order to transmit data, the UE performs a dynamic scheduling procedure when the UE acquires new data for transmission. When the UE has new data, the UE may send a scheduling request (SR) to the base station. The base station may respond to the scheduling request by sending a grant to the UE. For example, the base station provides a default uplink grant that is used by the UE to transmit a buffer status report (BSR).

A buffer status report refers to a media access control (MAC) layer message sent from the UE to the base station indicating how much data is waiting in a UE buffer for uplink transmission. Contents of the UE buffer may include compressed data and uncompressed data.

Generation of the buffer status report is complicated by uplink data compression. In one example, an uplink data compression (UDC) protocol may be based on a DEFLATE compress data formation specification (e.g., IETF RFC 1951) used to save uplink resources. In other examples, Level 0 or ZIP compression is employed. Compressed data refers to deflated (e.g., compressed) blocks generated from an original packet data convergence protocol (PDCP) service data unit (SDU) stored in a compression buffer of the UE. Uncompressed data refers to original PDCP SDU data for SDUs, which are not compressed, stored in a non-compression buffer.

According to the 5G NR standard, the buffer status report is configured to report a MAC buffer occupancy, which refers to the total number of bytes in the non-compression buffer and the number of bytes in the compression buffer. In this configuration, the buffer status report is a MAC buffer occupancy report indicating an amount of compressed data (in the compression buffer) plus an amount of uncompressed data (in the non-compressed buffer). Unfortunately, an actual amount of buffer status report data requested by the UE is generally higher than specified for transmitting compressed bytes over an uplink channel. In particular, the buffer status report triggered by the UE generally does not account for a time delay incurred due to the noted dynamic scheduling, which includes transmission of the buffer status report, network grants, and uplink data transmission. This excess uplink resource allocation results in wasted uplink network resources as well as additional consumption of UE uplink power.

Aspects of the present disclosure are directed to reducing wasted uplink resources. For example, uplink resources are wasted because buffer status reports generated by the user equipment (UE) are usually higher than specified for uplink transmission of compressed bytes. In particular, the UE-triggered buffer status report generally does not account for the additional compression of bytes during a time delay incurred due to the generation of the buffer status report, network grants, and uplink data transmission. This failure to account for additional compression leads to wasted uplink network resources and additional consumption of uplink power by the UE.

In operation, the buffer status report is based on a MAC buffer occupancy report, which indicates an uplink data bandwidth equal to an amount of compressed data (e.g., within a compression buffer) plus an amount of uncompressed data (e.g., in a non-compression buffer). Typical UE behavior is as follows:

At time, t=0
 Data in the compression buffer=0
 Data in the non-compression buffer=X
At time, $t=T_1$ (e.g., $X_1$ amount of data from the non-compression buffer is compressed to $X_1'$ and put in the compression buffer)
 Data in the compressed buffer=$X_1'$
 Data in the non-compressed buffer=$X-X_1$, where $X_1'<X_1$.
The triggered buffer status report indicates an uplink data bandwidth amount equal to the amount of data in the compressed buffer plus the amount of data in the non-compressed buffer=$X-X_1+X_1'$.
At time, $t=T_1+T_2$ (e.g., the $X_2$ amount of data from the non-compression buffer is compressed to $X_2'$ and put in the compression buffer)
 Data in the compressed buffer equals: $X_1'+X_2'$
 Data in the non-compressed buffer equals: $X-X_1-X_2$, where $X_2'<X_2$.
The total data to be sent in both the compression buffer and the non-compression buffer equals: $(X-X_1-X_2+X_1'+X_2')$, where $X_1'<X_1$ and $X_2'<X_2$.
The UE receives grants from the network at time t $(=T_1+T_2)$, in which the grants from the network are for an uplink data bandwidth equal to: $X-X_1+X_1'$.
In this example, an amount of wasted network bandwidth equals: $(X-X_1+X_1')-(X-X_1-X_2+X_1'+X_2')=X_2-X_2'$ In this example, the current mechanism of deflating uplink data compression consumes more grants (e.g., ~45%) than what is specified. In operation, the extra space is filled with padding, which decreases the network capacity by approximately half. That is, to transmit the extra padding (e.g., ~45%), a significant amount (e.g., ~40%) of additional UE power is consumed. As described, this padding may be referred to as an amount of media access control (MAC) padding data for an uplink transmission. According to aspects of the present disclosure, uplink bandwidth is saved by predicting an amount of data that can be compressed during the time delay incurred due to the buffer status report, network grants, and uplink data transmission. This predicted amount (e.g., a computed amount) of data is considered when triggering a buffer status report. In some configurations, the prediction is performed using machine learning with a neural processing engine (NPE), for example, as shown in FIG. 6.

Figure 6:
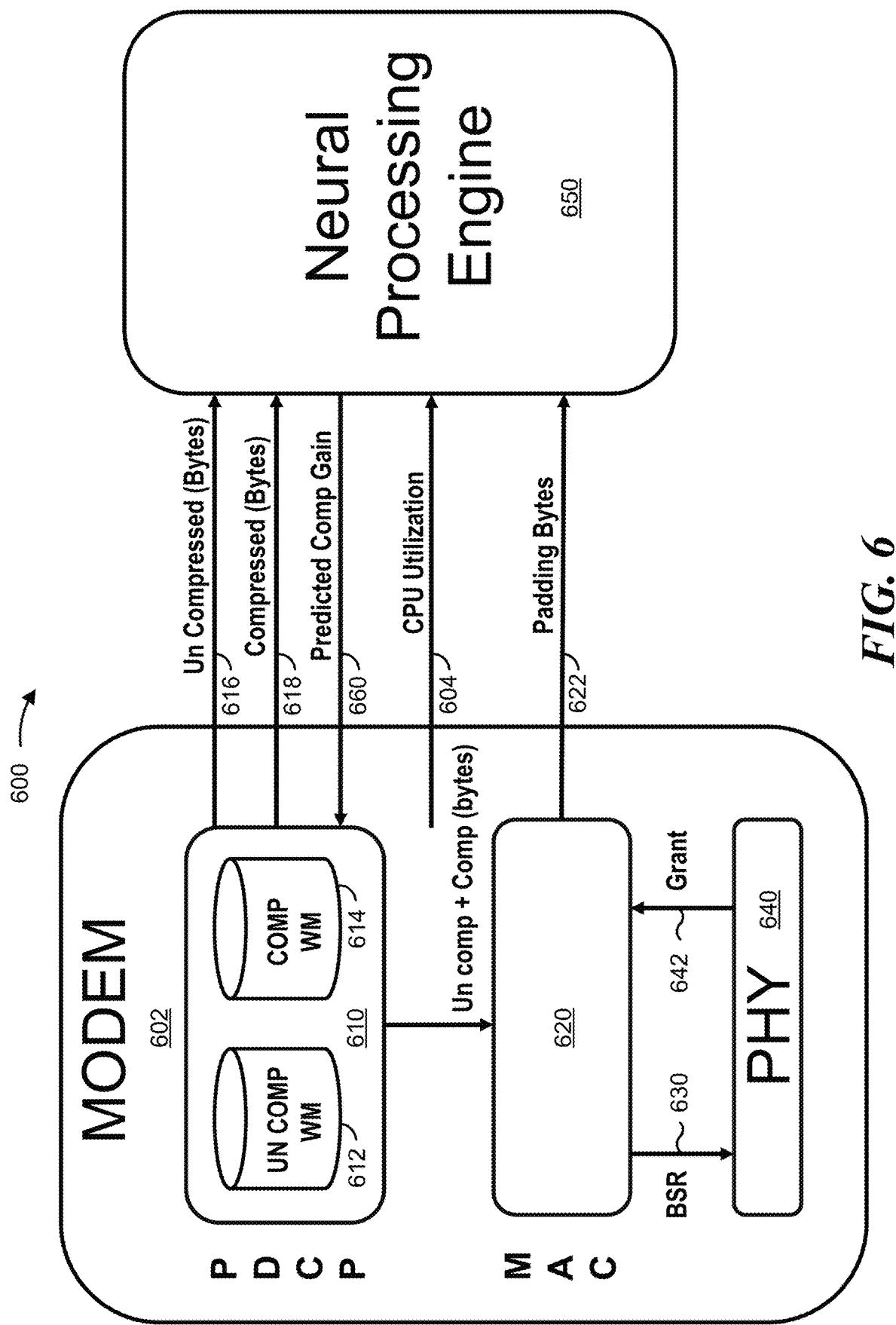
FIG. 6 is a block diagram illustrating a modem and a neural processing engine configured for uplink (UL) bandwidth enhancement with machine learning compression estimates, in accordance with various aspects of the present disclosure.

FIG. 6 is a block diagram of a UE 600 illustrating a modem and a neural processing engine configured for uplink (UL) bandwidth enhancement with machine learning compression estimates, in accordance with various aspects of the present disclosure. In some configurations, a modem 602 includes a packet data convergence protocol (PDCP) layer 610, a media access control (MAC) layer 620, and a physical (PHY) layer 640. In this example, the PDCP layer 610 includes a non-compression buffer 612 storing uncompressed watermark bytes 616, and a compression buffer 614 storing compressed watermark bytes 618. In these configurations, the modem 602 is coupled to a neural processing engine 650.

According to aspects of the present disclosure, the neural processing engine 650 is trained to predict an amount of data that can be compressed during a time delay incurred due to triggering a buffer status report 630, receiving a grant 642, and uplink data transmission. In this example, the predicted amount of data is provided to the modem 602 by the neural processing engine 650 as a predicted compression gain 660. In response to the predicted compression gain 660, the PDCP layer 610 is configured to predict an amount of compressed data in the compression buffer 614 by adjusting an amount of the compressed watermark bytes 618 by the predicted compression gain 660. The predicted amount of the compressed watermark bytes 618 is used to adjust the determined amount of the uncompressed watermark bytes 616 in the non-compression buffer 612. The predicted amount of the compressed watermark bytes 618 and the adjusted amount of the uncompressed watermark bytes 616 are considered by the MAC layer 620 when triggering the buffer status report 630. The PHY layer 640 receives the buffer status report 630 with the predicted amount of the compressed watermark bytes 618 and the adjusted amount of the uncompressed watermark bytes 616 to request the grant 642 from the network.

According to aspects of the present disclosure, different modem metrics including the uncompressed watermark bytes 616, the compressed watermark bytes 618, a central processing unit (CPU) utilization 604, and padding bytes 622 are fed to the neural processing engine 650. CPU utilization may affect compression results because other applications may be running, limiting an amount of headroom available for the compressing, and thus preventing full compression. In this example, the different modem metrics can be used as historical data to train the neural processing engine 650 in understanding the compression gain under different modem conditions. In other aspects of the present disclosure, using deep learning and prediction analysis, the neural processing engine can predict how much the future data can be compressed. This information is used by the PDCP layer 610 while providing the available pending data bytes to the MAC layer 620 for requesting the grant 642 by sending the buffer status report 630 to the PHY layer 640 for transmission to the network. For example, the MAC layer 620 generates the buffer status report 630 according to a computed amount of the compressed data in the compression buffer 614 and the determined amount of uncompressed data in the non-compression buffer 612.

In other aspects of the present disclosure, a different geographical location with a varying data traffic pattern can seamlessly benefit from the machine learning models, which can be universally applied to any operator in different geographical locations including rural and urban areas, which have more and less sparsity, respectively. For example, based on location, a data traffic pattern may be obtained and used in an appropriate neural network model. In other aspects of the present disclosure, the neural processing engine 650 uses historical data based on time to predict compression gains, as data traffic patterns dynamically change during the day and, also between day and night. For example, predicting compression with the machine learning model may be based on a traffic pattern associated with a current location of the UE. In another example, predicting compression with the machine learning model is based on a traffic pattern associated with a current time of day.

In some configurations, the neural processing engine is trained using supervised learning. Supervised learning is a machine learning task of inferring a function from labeled training data. The training data consists of a set of training examples composed of compression gains. In supervised learning, each example is a pair consisting of an input object (typically a vector) and a desired output value (also referred to as a supervisory signal). A supervised learning algorithm analyzes the training data and produces an inferred function, which can be used for mapping new examples. An optimal scenario allows for the algorithm to correctly determine the class labels for unseen instances. In this scenario, a learning algorithm generalizes from the training data to unseen situations in a "reasonable" way. In this example, the predicted compression gain 660 from the neural processing engine 650 beneficially provides a substantial increase (e.g., ~45%) in 5G network capacity, while decreasing power consumption of the UE by a significant amount (e.g., ~40%).

Figure 7:
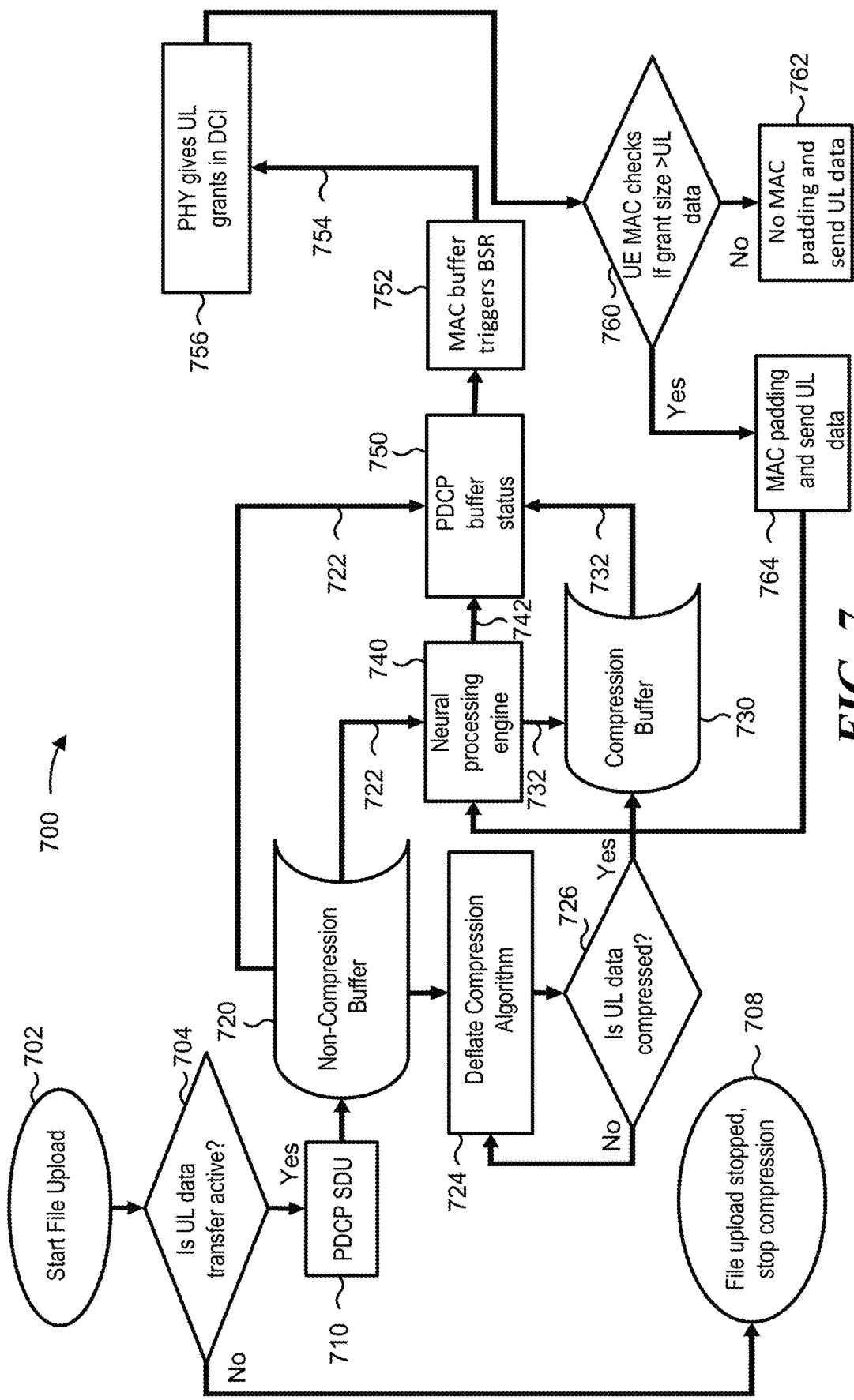
FIG. 7 is a flow diagram illustrating an uplink (UL) bandwidth enhancement with machine learning compression estimates performed, for example, by a transmitting device, in accordance with various aspects of the present disclosure.

FIG. 7 is a flow diagram illustrating an uplink (UL) bandwidth enhancement with machine learning compression predictions performed, for example, by a transmitting device, in accordance with various aspects of the present disclosure. An uplink compression process, e.g., a DEFLATE process 700, begins at block 702, in which a file upload is initiated. At block 704, it is determined whether an uplink data transfer is active. When the uplink data transfer is inactive, at block 708, the file upload as well as compression of the uplink data is stopped. Otherwise, at block 710, a packet data convergence protocol (PDCP) service data unit (SDU) is provided to a non-compression buffer 720. The original amount of uplink data stored in the non-compression buffer 720 is gradually compressed using a default compression algorithm, such as DEFLATE, at block 724. At block 726, it is determined whether the uplink data in the non-compression buffer 720 is compressed. As portions of the uplink data from the non-compression buffer 720 are compressed at block 710, the compressed portions are stored in a compression buffer 730. If the uplink data is not compressed, at block 724, compression is performed, for example with the DEFLATE algorithm, and the process returns to block 726.

In these aspects of the present disclosure, a neural processing engine 740 receives an uncompressed byte amount 722 from the non-compression buffer 720 and a compressed byte amount 732 from the compression buffer 730 to generate a predicted compression gain 742. Once determined, the predicted compression gain 742 is provided to a PDCP buffer status module 750. A buffer status report 754 is generated at block 752 by the PDCP buffer status module 750, based on a predicted amount of the compressed data in the compression buffer 730, an adjusted amount of the uncompressed data in the non-compression buffer 720, and the predicted compression gain 742.

In the example shown in FIG. 7, the uncompressed byte amount 722 and the compressed byte amount 732 are also provided to the PDCP buffer status module 750, although this is optional. In this optional configuration, the predicted compression gain 742 may be disregarded when it is determined to be inaccurate. When the predicted compression gain 742 is inaccurate, at block 752, a MAC buffer triggers the buffer status report 754 using the uncompressed byte amount 722 and the compressed byte amount 732, rather than the predicted compression gain 742. In other aspects, a minimum of the uncompressed byte amount 722 and the predicted compression gain 742 is used at the PDCP buffer status module 750 to obtain the PDCP buffer status.

The PDCP buffer status is considered by the MAC buffer when triggering the buffer status report 754 at block 752. A PHY layer receives the buffer status report 754 with the predicted compressed byte amount 732 and the adjusted uncompressed byte amount 722 and requests an uplink grant to be received in downlink control information (DCI) from the network, at block 756. At block 760, the MAC layer 620 of the UE 600 of FIG. 6 determines whether a grant data size is greater than an uplink data amount indicated in the buffer status report 754. When the grant data size is greater than the uplink data amount, padding is generated and added by the MAC layer and the uplink data is sent, at block 764. The amount of padding is then fed back to the neural processing engine 740. Otherwise, the MAC layer skips the padding and transmits the uplink data at block 762.

Although FIG. 7 describes an uplink compression process (e.g., a DEFLATE process 700), it should be recognized that other uplink compression processes are contemplated according to aspects of the present disclosure. For example, aspects of the present disclosure accommodate all types of uplink compression including, but not limited to, robust header compression (ROHC) or other like uplink compression processes.

Figure 8:
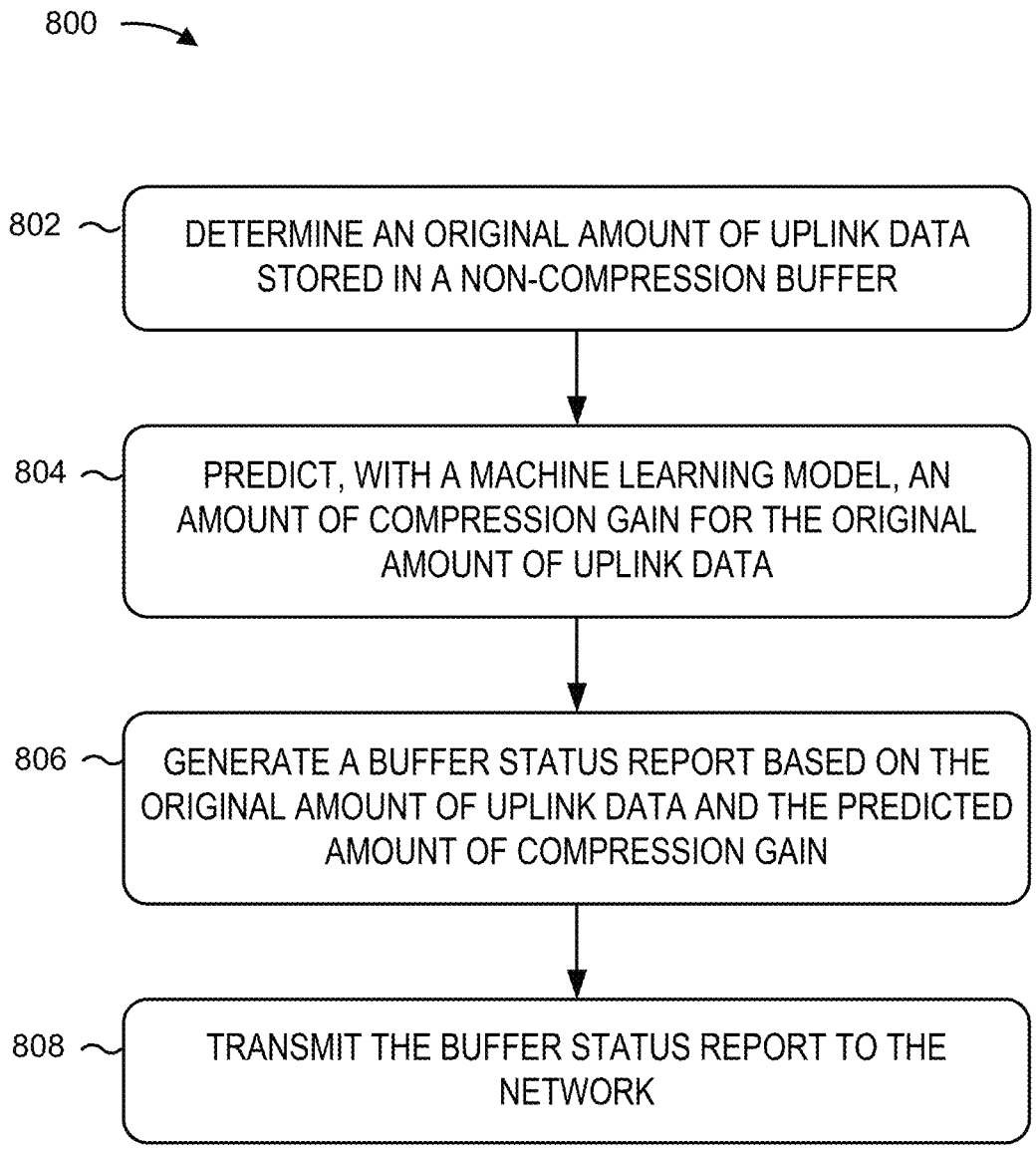
FIG. 8 is a flow diagram illustrating an example process performed, for example, by a user equipment (UE), in accordance with various aspects of the present disclosure.

FIG. 8 is a flow diagram illustrating an example process 800 performed, for example, by a UE, in accordance with various aspects of the present disclosure. The example process 800 is an example of a 5G new radio (NR) uplink (UL) bandwidth enhancement with machine learning compression estimates.

As shown in FIG. 8, in some aspects, the process 800 includes determining an original amount of uplink data stored in a non-compression buffer (block 802). The original amount of data is designated to be transmitted to a network. For example, the UE (e.g., using the controller/processor 280, and/or the memory 282) can determine the original amount of uplink data. In some aspects, the process 800 also includes predicting, with a machine learning model, an amount of compression gain for the original amount of uplink data (block 804). The compression gain is obtained by compressing the original amount of uplink data during a time delay. For example, the UE (e.g., using the controller/processor 280, and/or the memory 282) can predict the compression gain. In some aspects, the predicting is based on a current amount of uncompressed data stored in the non-compression buffer, a current amount of compressed data stored in a compression buffer, a central processing unit (CPU) utilization, and/or an amount of media access control (MAC) padding data for an uplink transmission. The predicting may be based on a traffic pattern associated with a current UE location and/or a current time of day.

In some aspects, the process 800 further includes generating a buffer status report based on the original amount of uplink data and the predicted amount of compression gain (block 806). For example, the UE (e.g., using the controller/processor 280, and/or the memory 282) can generate the buffer status report. The buffer status report may be generated by computing an amount of compressed data in a compression buffer according to the original amount of uplink data in the non-compression buffer and the predicted compression gain; determining an amount of uncompressed data in the non-compression buffer according to the computed amount of the compressed data in the compression buffer; and generating the buffer status report according to the computed amount of the compressed data in the compression buffer and the determined amount of uncompressed data in the non-compression buffer.

In some aspects, the process 800 further includes transmitting the buffer status report to the network (block 808). For example, the UE (e.g., using the antenna 252, the DEMOD/MOD 254, the TX MIMO processor 266, the transmit processor 264, the controller/processor 280, and/or the memory 282) can transmit the buffer status report. In some aspects, the transmitting of the uplink data to the network occurs without padding when a grant data size is less than or equal to a current amount of uncompressed data stored in the non-compression buffer plus a current amount of compressed data stored in a compression buffer after the delay.

Example Aspects

Aspect 1: A method of wireless communication by a user equipment (UE), comprising: determining an original amount of uplink data stored in a non-compression buffer, the original amount of uplink data designated to be transmitted to a network; predicting, with a machine learning model, an amount of compression gain for the original amount of uplink data, the amount of compression gain obtained by compressing the original amount of uplink data during a time delay; generating a buffer status report based on the original amount of uplink data and the predicted amount of compression gain; transmitting the buffer status report to the network.

Aspect 2: The method of Aspect 1, in which the predicting is based on a current amount of uncompressed data stored in the non-compression buffer, a current amount of compressed data stored in a compression buffer, a central processing unit (CPU) utilization, and/or an amount of media access control (MAC) padding data for an uplink transmission.

Aspect 3: The method of Aspect 1 or 2, in which the predicting is based on a traffic pattern associated with a current location of the UE.

Aspect 4: The method of any of the preceding Aspects, in which the predicting is based on a traffic pattern associated with a current time of day.

Aspect 5: The method of any of the preceding Aspects, in which the time delay corresponds to a delay incurred for generating the buffer status report, a delay corresponding to a time for receiving a network grant, and/or a delay corresponding to uplink transmission.

Aspect 6: The method of any of the preceding Aspects, further comprising receiving from the machine learning model the predicted amount of compression gain, at a packet data convergence protocol (PDCP) layer.

Aspect 7: The method of any of the preceding Aspects, in which generating the buffer status report comprises: computing an amount of compressed data in a compression buffer according to the original amount of uplink data in the non-compression buffer and the predicted compression gain; determining an amount of uncompressed data in the non-compression buffer according to the computed amount of compressed data in the compression buffer; and generating the buffer status report according to the computed amount of compressed data in the compression buffer and the determined amount of uncompressed data in the non-compression buffer.

Aspect 8: The method of any of the preceding Aspects, further comprising training the machine learning model with supervised learning using training examples comprising compression gains.

Aspect 9: The method of any of the preceding Aspects, further comprising training the machine learning model by feeding the machine learning model a current amount of uncompressed data stored in the non-compression buffer, a current amount of compressed data stored in a compression buffer, a central processing unit (CPU) utilization, and/or an amount of media access control (MAC) padding data for an uplink transmission as historical data during operation of the UE.

Aspect 10: The method of any of the preceding Aspects, further comprising transmitting the uplink data to the network without padding when a grant data size is less than or equal to a current amount of uncompressed data stored in the non-compression buffer plus a current amount of compressed data stored in a compression buffer after the delay.

Aspect 11: An apparatus for wireless communication by a user equipment (UE), comprising: means for determining an original amount of uplink data stored in a non-compression buffer, the original amount of uplink data designated to be transmitted to a network; means for predicting, with a machine learning model, an amount of compression gain for the original amount of uplink data, the amount of compression gain obtained by compressing the original amount of uplink data during a time delay; means for generating a buffer status report based on the original amount of uplink data and the predicted amount of compression gain; and means for transmitting the buffer status report to the network.

Aspect 12: The apparatus of Aspect 11, in which the means for predicting is based on a current amount of uncompressed data stored in the non-compression buffer, a current amount of compressed data stored in a compression buffer, a central processing unit (CPU) utilization, and/or an amount of media access control (MAC) padding data for an uplink transmission.

Aspect 13: The apparatus of Aspect 11 or 12, in which the means for predicting is based on a traffic pattern associated with a current location of the UE.

Aspect 14: The apparatus of any of the Aspects 11-13, in which the means for predicting is based on a traffic pattern associated with a current time of day.

Aspect 15: The apparatus of any of the Aspects 11-14, in which the time delay corresponds to a delay incurred for generating the buffer status report, a delay corresponding to a time for receiving a network grant, and/or a delay corresponding to uplink transmission.

Aspect 16: The apparatus of any of the Aspects 11-15, further comprising means for receiving from the machine learning model the predicted amount of compression gain, at a packet data convergence protocol (PDCP) layer.

Aspect 17: The apparatus of any of the Aspects 11-16, in which the means for generating the buffer status report comprises: means for computing an amount of compressed data in a compression buffer according to the original amount of uplink data in the non-compression buffer and the predicted compression gain; means for determining an amount of uncompressed data in the non-compression buffer according to the computed amount of compressed data in the compression buffer; and means for generating the buffer status report according to the computed amount of compressed data in the compression buffer and the determined amount of uncompressed data in the non-compression buffer.

Aspect 18: The apparatus of any of the Aspects 11-17, further comprising means for training the machine learning model with supervised learning using training examples comprising compression gains.

Aspect 19: The apparatus of any of the Aspects 11-18, further comprising means for training the machine learning model by feeding the machine learning model a current amount of uncompressed data stored in the non-compression buffer, a current amount of compressed data stored in a compression buffer, a central processing unit (CPU) utilization, and/or an amount of media access control (MAC) padding data for an uplink transmission as historical data during operation of the UE.

Aspect 20: The apparatus of any of the Aspects 11-19, further comprising means for transmitting the uplink data to the network without padding when a grant data size is less than or equal to a current amount of uncompressed data stored in the non-compression buffer plus a current amount of compressed data stored in a compression buffer after the delay.

Aspect 21: A user equipment (UE), comprising: a processor; a memory coupled with the processor; and instructions stored in the memory and operable, when executed by the processor, to cause the UE: to determine an original amount of uplink data stored in a non-compression buffer, the original amount of uplink data designated to be transmitted to a network; to predict, with a machine learning model, an amount of compression gain for the original amount of uplink data, the amount of compression gain obtained by compressing the original amount of uplink data during a time delay; to generate a buffer status report based on the original amount of uplink data and the predicted amount of compression gain; and to transmit the buffer status report to the network.

Aspect 22: The UE of Aspect 21, in which the instruction to predict is based on a current amount of uncompressed data stored in the non-compression buffer, a current amount of compressed data stored in a compression buffer, a central processing unit (CPU) utilization, and/or an amount of media access control (MAC) padding data for an uplink transmission.

Aspect 23: The UE of Aspect 21 or 22, in which the instruction to predict is based on a traffic pattern associated with a current location of the UE.

Aspect 24: The UE of any of the Aspects 21-23, in which the instruction to predict is based on a traffic pattern associated with a current time of day.

Aspect 25: The UE of any of the Aspects 21-24, in which the time delay corresponds to a delay incurred to generate the buffer status report, a delay corresponding to a time to receive a network grant, and/or a delay corresponding to uplink transmission.

Aspect 26: The UE of any of the Aspects 21-25, in which the instructions further cause the UE to receive from the machine learning model the predicted amount of compression gain, at a packet data convergence protocol (PDCP) layer.

Aspect 27: The UE of any of the Aspects 21-26, in which the instruction to generate the buffer status report further causes the UE: to compute an amount of compressed data in a compression buffer according to the original amount of uplink data in the non-compression buffer and the predicted compression gain; to determine an amount of uncompressed data in the non-compression buffer according to the computed amount of compressed data in the compression buffer; and to generate the buffer status report according to the computed amount of compressed data in the compression buffer and the determined amount of uncompressed data in the non-compression buffer.

Aspect 28: The UE of any of the Aspects 21-27, in which the instructions further cause the UE to train the machine learning model with supervised learning using training examples comprising compression gains.

Aspect 29: The UE of any of the Aspects 21-28, in which the instructions further cause the UE to train the machine learning model by feeding the machine learning model a current amount of uncompressed data stored in the non-compression buffer, a current amount of compressed data stored in a compression buffer, a central processing unit (CPU) utilization, and/or an amount of media access control (MAC) padding data for an uplink transmission as historical data during operation of the UE.

Aspect 30: The UE of any of the Aspects 21-29, in which the instructions further cause the UE to transmit the uplink data to the network without padding when a grant data size is less than or equal to a current amount of uncompressed data stored in the non-compression buffer plus a current amount of compressed data stored in a compression buffer after the delay.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   determining an original amount of uplink data stored in a non-compression buffer, the original amount of uplink data designated to be transmitted to a network;
   predicting, with a machine learning model, an amount of compression gain for the original amount of uplink data, the amount of compression gain obtained by compressing the original amount of uplink data during a time delay;
   generating a buffer status report based on the original amount of uplink data and the predicted amount of compression gain; and
   transmitting the buffer status report to the network.

2. The method of claim 1, in which the predicting is based on a current amount of uncompressed data stored in the non-compression buffer, a current amount of compressed data stored in a compression buffer, a central processing unit (CPU) utilization, and/or an amount of media access control (MAC) padding data for an uplink transmission.

3. The method of claim 2, in which the predicting is based on a traffic pattern associated with a current location of the UE.

4. The method of claim 2, in which the predicting is based on a traffic pattern associated with a current time of day.

5. The method of claim 1, in which the time delay corresponds to a delay incurred for generating the buffer status report, a delay corresponding to a time for receiving a network grant, and/or a delay corresponding to uplink transmission.

6. The method of claim 1, further comprising receiving from the machine learning model the predicted amount of compression gain, at a packet data convergence protocol (PDCP) layer.

7. The method of claim 1, in which generating the buffer status report comprises:
   computing an amount of compressed data in a compression buffer according to the original amount of uplink data in the non-compression buffer and the predicted compression gain;
   determining an amount of uncompressed data in the non-compression buffer according to the computed amount of compressed data in the compression buffer; and
   generating the buffer status report according to the computed amount of compressed data in the compression buffer and the determined amount of uncompressed data in the non-compression buffer.

8. The method of claim 1, further comprising training the machine learning model with supervised learning using training examples comprising compression gains.

9. The method of claim 1, further comprising training the machine learning model by feeding the machine learning model a current amount of uncompressed data stored in the non-compression buffer, a current amount of compressed data stored in a compression buffer, a central processing unit (CPU) utilization, and/or an amount of media access control (MAC) padding data for an uplink transmission as historical data during operation of the UE.

10. The method of claim 1, further comprising transmitting the uplink data to the network without padding when a grant data size is less than or equal to a current amount of uncompressed data stored in the non-compression buffer plus a current amount of compressed data stored in a compression buffer after the delay.

11. An apparatus for wireless communication by a user equipment (UE), comprising:
    means for determining an original amount of uplink data stored in a non-compression buffer, the original amount of uplink data designated to be transmitted to a network;
    means for predicting, with a machine learning model, an amount of compression gain for the original amount of uplink data, the amount of compression gain obtained by compressing the original amount of uplink data during a time delay;
    means for generating a buffer status report based on the original amount of uplink data and the predicted amount of compression gain; and
    means for transmitting the buffer status report to the network.

12. The apparatus of claim 11, in which the means for predicting is based on a current amount of uncompressed data stored in the non-compression buffer, a current amount of compressed data stored in a compression buffer, a central processing unit (CPU) utilization, and/or an amount of media access control (MAC) padding data for an uplink transmission.

13. The apparatus of claim 12, in which the means for predicting is based on a traffic pattern associated with a current location of the UE.

14. The apparatus of claim 12, in which the means for predicting is based on a traffic pattern associated with a current time of day.

15. The apparatus of claim 11, in which the time delay corresponds to a delay incurred for generating the buffer status report, a delay corresponding to a time for receiving a network grant, and/or a delay corresponding to uplink transmission.

16. The apparatus of claim 11, further comprising means for receiving from the machine learning model the predicted amount of compression gain, at a packet data convergence protocol (PDCP) layer.

17. The apparatus of claim 11, in which the means for generating the buffer status report comprises:
    means for computing an amount of compressed data in a compression buffer according to the original amount of uplink data in the non-compression buffer and the predicted compression gain;

means for determining an amount of uncompressed data in the non-compression buffer according to the computed amount of compressed data in the compression buffer; and means for generating the buffer status report according to the computed amount of compressed data in the compression buffer and the determined amount of uncompressed data in the non-compression buffer.

18. The apparatus of claim 11, further comprising means for training the machine learning model with supervised learning using training examples comprising compression gains.

19. The apparatus of claim 11, further comprising means for training the machine learning model by feeding the machine learning model a current amount of uncompressed data stored in the non-compression buffer, a current amount of compressed data stored in a compression buffer, a central processing unit (CPU) utilization, and/or an amount of media access control (MAC) padding data for an uplink transmission as historical data during operation of the UE.

20. The apparatus of claim 11, further comprising means for transmitting the uplink data to the network without padding when a grant data size is less than or equal to a current amount of uncompressed data stored in the non-compression buffer plus a current amount of compressed data stored in a compression buffer after the delay.

21. A user equipment (UE), comprising:
a processor;
a memory coupled with the processor; and
instructions stored in the memory and operable, when executed by the processor, to cause the UE:
to determine an original amount of uplink data stored in a non-compression buffer, the original amount of uplink data designated to be transmitted to a network;
to predict, with a machine learning model, an amount of compression gain for the original amount of uplink data, the amount of compression gain obtained by compressing the original amount of uplink data during a time delay;
to generate a buffer status report based on the original amount of uplink data and the predicted amount of compression gain; and
to transmit the buffer status report to the network.

22. The UE of claim 21, in which the instruction to predict is based on a current amount of uncompressed data stored in the non-compression buffer, a current amount of compressed data stored in a compression buffer, a central processing unit (CPU) utilization, and/or an amount of media access control (MAC) padding data for an uplink transmission.

23. The UE of claim 22, in which the instruction to predict is based on a traffic pattern associated with a current location of the UE.

24. The UE of claim 22, in which the instruction to predict is based on a traffic pattern associated with a current time of day.

25. The UE of claim 21, in which the time delay corresponds to a delay incurred to generate the buffer status report, a delay corresponding to a time to receive a network grant, and/or a delay corresponding to uplink transmission.

26. The UE of claim 21, in which the instructions further cause the UE to receive from the machine learning model the predicted amount of compression gain, at a packet data convergence protocol (PDCP) layer.

27. The UE of claim 21, in which the instruction to generate the buffer status report further causes the UE:
to compute an amount of compressed data in a compression buffer according to the original amount of uplink data in the non-compression buffer and the predicted compression gain;
to determine an amount of uncompressed data in the non-compression buffer according to the computed amount of compressed data in the compression buffer; and
to generate the buffer status report according to the computed amount of compressed data in the compression buffer and the determined amount of uncompressed data in the non-compression buffer.

28. The UE of claim 21, in which the instructions further cause the UE to train the machine learning model with supervised learning using training examples comprising compression gains.

29. The UE of claim 21, in which the instructions further cause the UE to train the machine learning model by feeding the machine learning model a current amount of uncompressed data stored in the non-compression buffer, a current amount of compressed data stored in a compression buffer, a central processing unit (CPU) utilization, and/or an amount of media access control (MAC) padding data for an uplink transmission as historical data during operation of the UE.

30. The UE of claim 21, in which the instructions further cause the UE to transmit the uplink data to the network without padding when a grant data size is less than or equal to a current amount of uncompressed data stored in the non-compression buffer plus a current amount of compressed data stored in a compression buffer after the delay.

* * * * *